United States Patent [19]

Tautz et al.

[11] 4,410,487
[45] Oct. 18, 1983

[54] CORE BAFFLE OR ENCLOSURE AND METHOD OF FABRICATING THE SAME

[75] Inventors: Jürgen Tautz, Hemhofen; Lothar Werres, Langensendelbach; Gerd Reimer, Erlangen, all of Fed. Rep. of Germany

[73] Assignee: Kraftwerk Union Aktiengesellschaft, Mülheim, Fed. Rep. of Germany

[21] Appl. No.: 34,122

[22] Filed: Apr. 27, 1979

[30] Foreign Application Priority Data

Apr. 28, 1978 [DE] Fed. Rep. of Germany ....... 2818886

[51] Int. Cl.³ ............. G21C 3/06; G21C 21/00; B23K 31/00
[52] U.S. Cl. .................... 376/399; 228/182; 228/184
[58] Field of Search ............... 228/182, 184; 176/65, 176/87, 85, 78; 220/71, 5 A, 3; 52/245, 224; 376/377, 389, 399

[56] References Cited

U.S. PATENT DOCUMENTS

| | | | |
|---|---|---|---|
| 1,074,645 | 10/1913 | Reed | 52/245 |
| 1,290,093 | 1/1919 | Cole | 228/182 |
| 3,356,589 | 12/1967 | Grell et al. | 176/85 |
| 3,424,239 | 1/1969 | Coudray | 52/224 |
| 3,823,066 | 7/1974 | Thome' | 176/87 |
| 3,863,408 | 2/1975 | Closner et al. | 220/3 |
| 3,874,545 | 4/1975 | Struss | 220/5 A |
| 3,987,860 | 10/1976 | Jabsen | 176/87 |
| 4,158,605 | 6/1979 | Cooper, Jr. et al. | 176/87 |

OTHER PUBLICATIONS

*Welding Handbook*, American Welding Society, N.Y. N.Y., 1942, pp. 175, 176, 259.

Primary Examiner—Daniel C. Crane
Attorney, Agent, or Firm—Herbert L. Lerner

[57] ABSTRACT

Method of producing a core baffle with a plurality of horizontally disposed, parallel profile-rib rings for enclosing the fuel assemblies of a pressurized-water reactor, the profile-rib rings being formed with respective cutouts having a polygonal contour corresponding to that of the reactor core and with baffle plates secured vertically to the profile-rib rings and forming a casing matching the contours of the cutouts, which includes fastening to the profile-rib rings, by welding, one end of a plurality of ribs having a height corresponding to a mutual spacing of the profile-rib rings; successively welding the profile-rib rings to one another by the respective ribs thereof into a cage; assembling baffle plates bent partly into profile sections into the form of casing by bracing the plates against the cage; successively welding the baffle plates to the profile-rib rings of the cage; and welding the baffle plates to one another into a tight casing.

7 Claims, 7 Drawing Figures

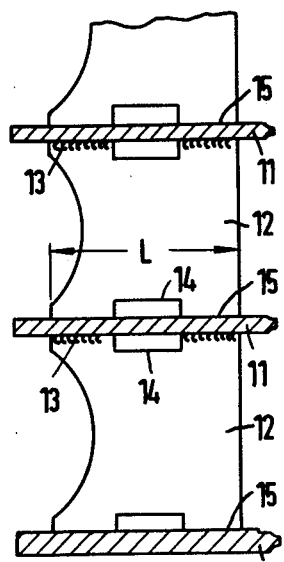
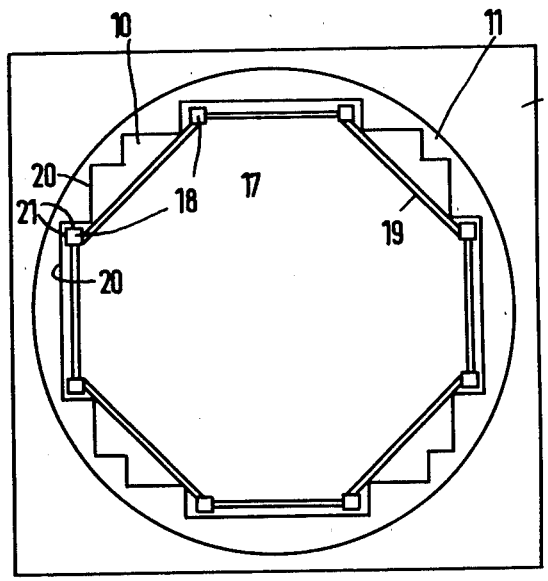 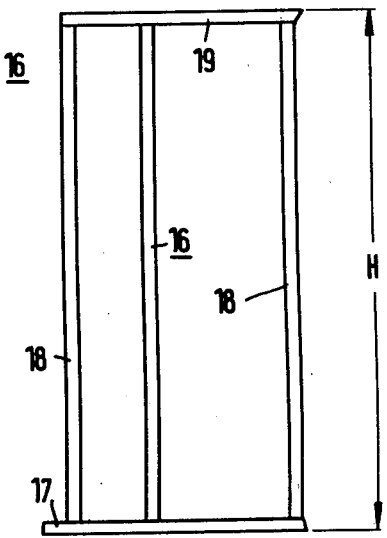

CORE BAFFLE OR ENCLOSURE AND METHOD OF FABRICATING THE SAME

The invention relates to a core baffle or enclosure and to a method of fabricating such a core baffle which is, more particularly, welded and serves to enclose the fuel assemblies of a pressurized-water reactor. Such a core baffle is formed of several parallel profile-rib rings which are disposed horizontally and are provided with cutouts or recesses having a polygonal contour corresponding to that of the reactor core, and baffle plates or sheets which are secured vertically to the profile-rib rings and form a casing or jacket matching the contour of the cutout. Such core enclosures, with regard to corrosion resistance, are formed of austenitic steel, which is known to require special care in welding. The core baffles have a diameter of about 4 m and a length of about 5 m. Due to this size or overall dimension, the magnitude of the noncalculable welding distortion is most important with regard to economic production and strength (as uniform as possible wall thickness of the baffle plates).

In normal operation, core baffles are subjected, in addition, to considerable stresses due to coolant flow and varying thermal expansion. Simultaneously, the tolerances of the inner contour are very narrow for reasons of fuel assembly guidance.

For the foregoing reasons, core baffles have heretofore virtually exclusively been bolted together from individual parts. This means that the individual parts must be fabricated to exact dimensions in order to attain the prescribed or specified measurements in the assembled condition thereof. In addition, large assembly costs accrue and additional installation or assembly time at a particularly critical period of time results therefrom.

During experiments or attempts to fabricate core baffles by welding, difficulties have been encountered heretofore due to the distortion caused by the welding. It is accordingly an object of the invention to provide a method for fabricating core baffles wherein a distortion caused by welding is kept within narrow limits.

It is further an object of the invention to provide such a method as well as such core baffles which avoid the other foregoing heretofore known disadvantages of previously known methods and devices of these general types.

With the foregoing and other objects in view, there is provided, in accordance with the invention, a method of producing a core baffle with a plurality of horizontally disposed, parallel profile-rib rings for enclosing the fuel assemblies of a pressurized-water reactor, the profile-rib rings being formed with respective cutouts having a polygonal contour corresponding to that of the reactor core and with baffle plates secured vertically to the profile-rib rings and forming a casing matching the contours of the cutouts, which comprises fastening to the profile-rib rings, by welding, one end of a plurality of ribs having a height corresponding to a mutual spacing of the profile-rib rings; successively welding the profile-rib rings to one another by the respective ribs thereof into a cage; assembling baffle plates bent partly into profile sections into the form of a casing by bracing the plates against the cage; successively welding the baffle plates to the profile-rib rings of the cage; and welding the baffle plates to one another into a tight casing.

In accordance with another mode of the method according to the invention, the successive welding of the baffle plates to the profile-rib rings is effected starting from the middle profile-rib ring.

The method according to the invention provides, with the cage, a "construction element" which is the determining quantity for the fabrication of the casing or jacket formed by the baffle plates and helps avoid laborious remachining or refinishing of this casing or jacket.

On the other hand, the fabrication of the cage itself is accomplished in individual small steps, wherein the welding distortion can be controlled and kept within limits. The ribs can be welded to the profile-rib rings without any appreciable distortion by limiting the length of the welding seams. This applied also to the "assembly" of the individual profile-rib rings, wherein a further profile-rib ring which, in turn, has already been welded to ribs, is placed upon the free ends of the ribs which have already been connected to a given profile-rib ring. The correct position of the profile-rib rings relative to one another can be adjusted by suitable devices or fixtures such as templates or gages. Such templates or gages can be employed especially in a construction corresponding to the shape of the cutout, and, in fact, in the same manner for all welded joints between respective pairs of profile-rib rings which are provided with ribs. Furthermore, it is always possible to measure the cage and to remachine or refinish it, if necessary, before the baffle plates are introduced.

As mentioned hereinbefore, the baffle plates are assembled by means of the cage into the desired casing or jacket which sheathes the fuel assemblies of the reactor core. The baffle plates are then welded to individual profile-rib rings, respectively, before the welding of the next, and preferably adjacent, profile-rib ring occurs. In this connection, it may be important that the welding seam between the baffle plates and a profile-rib ring is begun. A connection of the baffle plates to the cage is thereby obtained, which is producible relatively simply, with exact dimensions and markedly without welding distortion. Only after that are the baffle plates welded together by elongated welds, which extend the height of the core, into a tight baffle. The cage as a dimensionally stiff or fixed structural element, thereby prevents deformation of the casing or jacket which would otherwise cause welding distortion.

In accordance with a further mode of the method of the invention, the welding of the baffle plates to one another comprises forming a welding seam therebetween both from inside and outside the region of the respective cutout, a welding-seam part being initially formed by hand from the outside and another welding-seam part being then formed by submerged arc welding from the inside. The outside referred to hereinbefore, is the side of the casing or jacket facing the profile-rib rings, which is partly covered by the ribs and the profile-rib rings. The other side (i.e. the inside), on the other hand, is accessible for the introduction therein of automatic welding equipment for submerged-arc welding.

The ribs welded to the profile-rib rings are supposed to connect and stiffen the profile-rib rings into a cage. So that the welding seams per se should produce no appreciable welding distortion in the profile-rib rings, the length of the welding seams can be limited to an extent necessary for maintaining the strength of the cage. For this reason, the core baffle constructed in accordance with the method of the invention, has ribs formed with respective cutouts at edges located at opposite ends thereof facing the respective profile-rib rings.

In accordance with an added feature of the invention, the cutouts formed at the edges at the opposite ends of the ribs have a length that is substantially as great as the length of the edge at the respective end which is welded to the respective profile-rib ring. It is, furthermore, conceivable that several cutouts and edge portions may be provided successively along the course of a rib.

It may furthermore be advantageous to provide a further connection of the cage to the baffle plates than in the region of the profile-rib rings. Thus, in accordance with an additional feature of the invention, the ribs which are disposed as spacers between the profile-rib rings, are formed with projections extending toward the baffle plates and secured thereto by weldment.

Moreover, in accordance with a concomitant mode of the invention, the method of producing the core baffle further comprises, before welding the baffle plates to the profile-rib rings, measuring the cage and refinishing or remachining it in accordance with any need therefor.

Other features which are considered as characteristic for the invention are set forth in the appended claims.

Although the invention is illustrated and described herein as embodied in enclosure and method for fabricating same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is a fragmentary elevational view, partly in section, of FIG. 1;

FIG. 3 is a reduced diagrammatic top plan view of FIG. 1 showing the structure of FIG. 1 in a measuring device;

FIG. 4 is an elevational view of the measuring device of FIG. 3;

Figure 1:
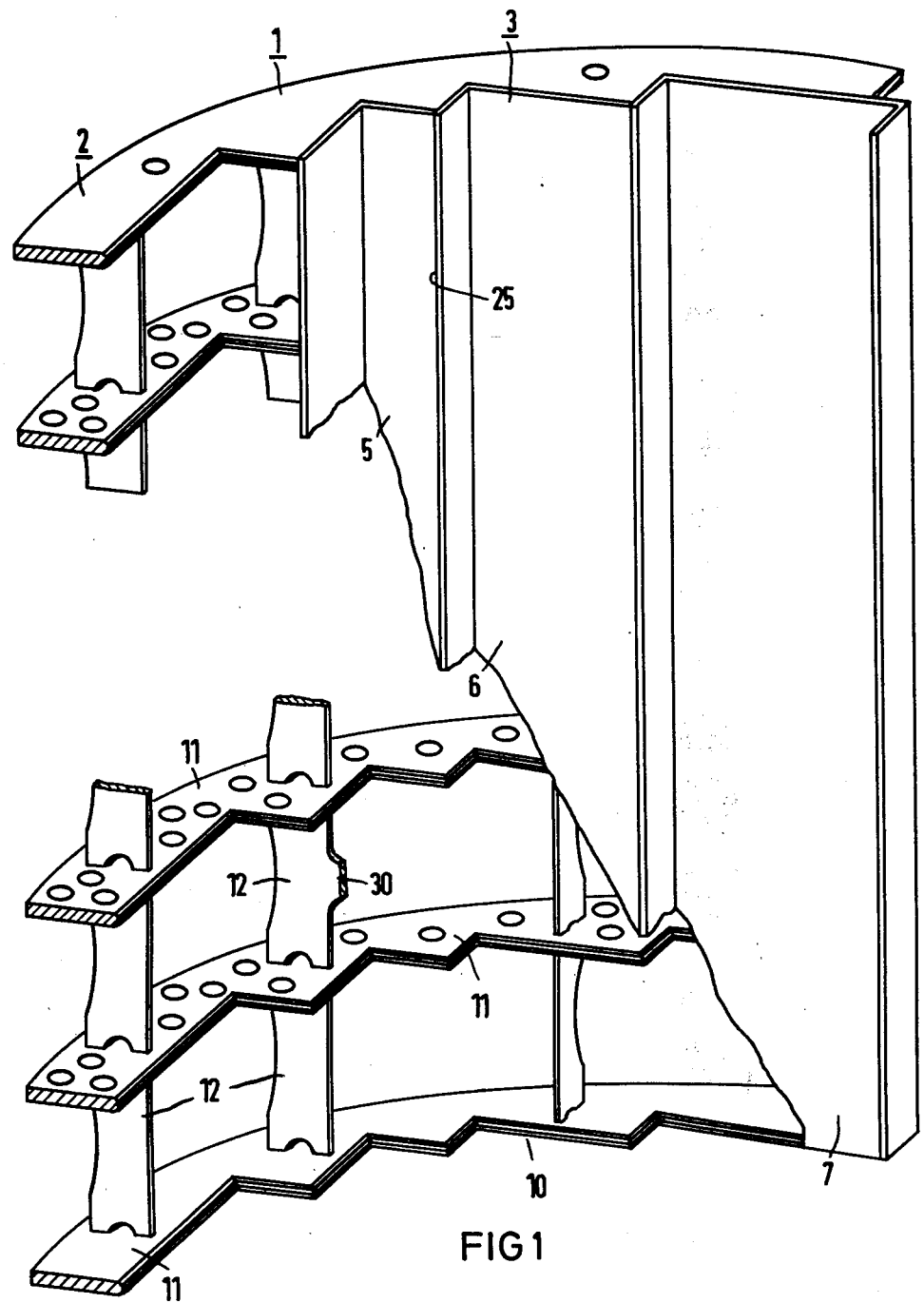
FIG. 1 is a fragmentary perspective view, partly broken away and in section, of a completely welded core baffle according to the invention as installed in pressurized-water power reactors wherein it is mounted between the non-illustrated reactor core formed of fuel assemblies, and the core casing or jacket which is, in turn, enclosed by a reactor pressure vessel, also non-illustrated.

Referring now to the drawing and first, particularly, to FIG. 1 thereof, there is shown a core baffle 1 formed of a cage 2 and a casing or jacket 3, made up of individual baffle plates 5, 6, and 7. The baffle plates 5, 6 and 7 are profiled or sectional plates, so that the casing 3 overall corresponds to the polygonal contour of a non-illustrated reactor core, the contour having been determined by the construction of the fuel assemblies. The same contour is provided as a recess or cutout 10 in the profile-rib rings 11 which are disposed above one another, extend horizontally in parallel with one another and are mutually connected by vertical ribs 12.

All parts of the core baffle 1 are formed of austenitic material and are mutually connected exclusively by welding seams, the production of which is described hereinafter.

As indicated in FIG. 2, the profile-rib or rib-forming rings 11 are initially welded individually to the ribs 12. The welding seams 13 are thereby produced. As can be seen quite clearly, the welding seams 13 extend only over about one-half the length L of the edge of the ribs 12 facing toward the profile-rib rings 11, because cutouts 14 have been provided in this region which extend over half the length L. Thereafter, the individual profile-rib rings 11, together with the vertical ribs 12 respectively welded thereto, are stacked on top of one another and the respective profile-rib rings 11 are then joined to the respective vertical ribs 12 of the next adjacent profile-rib rings 12 by mutually forming welds therebetween, which are not illustrated in FIG. 2. This operation is affected successively in a manner wherein, initially, all of the ribs 12 of a profile-rib ring 11 are welded at 15 to the adjacent profile-rib ring 11 before a next profile-rib ring 11 is placed thereon and then welded.

A top plan view of the profile-rib rings 11 disposed for welding in a measuring device or gaging fixture 16 is provided in FIG. 3. The measuring device 16 serves for orienting or aligning and for measuring the profile-rib rings 11 during the welding operation.

The gaging fixture or measuring device 16 includes a base plate 17, measuring columns 18 and stiffening bars or beams 19. As shown in FIG. 4, the measuring device 16 extends over the entire height H of the core baffle, which is practically equal to the height of the reactor core. The measuring columns 18 are accurately machined at least on the sides thereof facing toward the contour 20 of the cutout 10 of the profile-rib rings 11 i.e. at the perpendicular adjoining surfaces, so that a measurement base for orienting or aligning the profile-rib rings 11 and for measuring or checking after and during the formation of the weld is provided.

In contrast to the manner shown for the embodiment illustrated in FIGS. 3 and 4, the measuring device or fixture 16 can be stiffened further by braces or stiffening members which extend through the center of the cutout 10. The measuring device 16 can further be constructed as a welding device in the sense that direct alignment or orientation of the profile-rib rings 11 is effected through contact or engagement with the measuring surfaces 21.

After the case 2 has been completed, the baffle plates 5, 6 and 7 are suitably placed in the cutout 10 all around the profile thereof. The plates 5, 6 and 7 can be flat members, so that one plate or sheet of the casing or jacket 3 corresponds to each straight subsection of the contour 20. The plates 5, 6 and 7 can, however, also be bent into a profile section. FIG. 1 shows an embodiment of the invention wherein the plates 5 and 6, respectively, have an L-profile and the plate 7 a U-profile.

Figure 5:
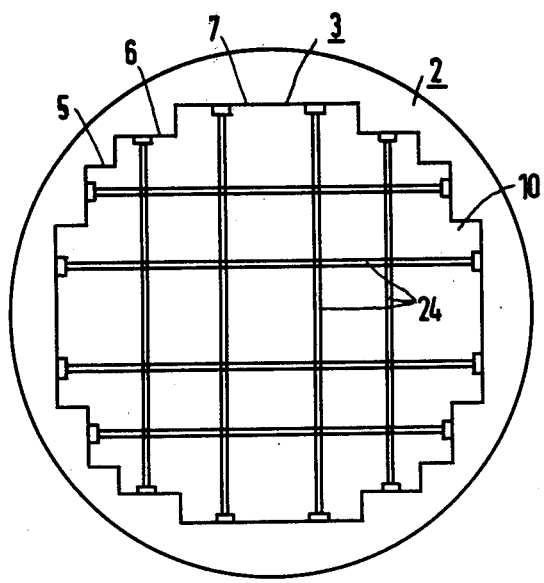
FIG. 5 is a reduced diagrammatic top plan view of FIG. 1 together with other equipment during a stage in the production thereof.

In the top plan view of FIG. 5, the casing or jacket 3, made up of a plurality of the respective baffle plates 5, 6 and 7 is clamped or braced within the cutout or recess 10 formed in the cage 2 by means of the stays or props 24. These stays 24 press the baffle plates 5, 6 and 7 against the cage 2 with adjustable force. In this position, the baffle plates 5, 6 and 7 are welded to the cage 2. This is effected in accordance with the welding sequence shown in FIG. 6. It is noted that the casing or jacket 3 having a height H is welded, starting from the middle thereof, to the profile-rib rings 11 of the cage 2; in the interest of clarity, the ribs 12 between the profile-rib rings 11 have been omitted in FIG. 6.

Figure 6:
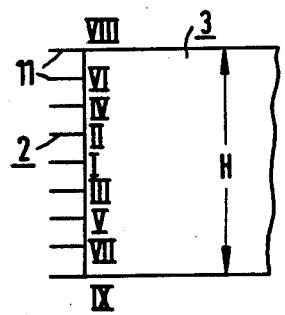
FIG. 6 is a diagrammatic fragmentary elevational view of FIG. 5 depicting the welding sequence for the core baffle.
Figure 7:
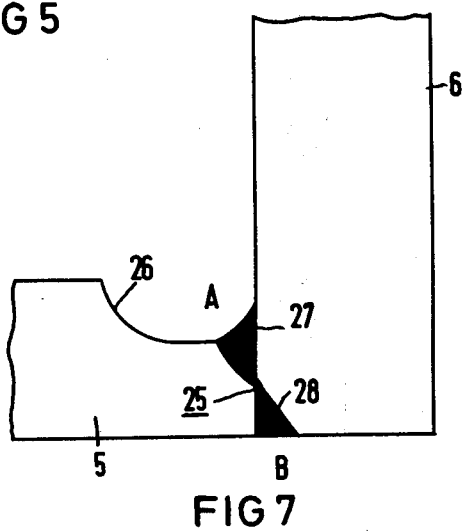
FIG. 7 is a much-enlarged fragmentary view of FIG. 6 showing the welded seams between respective baffle plates of the core baffle.

Of the nine profile-rib rings 11 shown diagrammatically in FIG. 6, the welded joint with the midmost profile-rib rings 11 is formed first. Thereafter, the welded joint is alternatingly formed on adjacent sides thereof, as indicated by the numerals I to IX. As a final step, the individual baffle plates 5, 6 and 7 are thereafter joined to form the completed, closed casing or jacket 3. The welding seams 25 required therefor between the baffle plates, such as the plates 5 and 6, for example, are formed from two sides, as shown in FIG. 7. From the outside identified by reference character A, a welding seam portion 27 is formed first in the region of a channel or fillet 26. Thereafter, the opposite side 28 of the welding seam 25 is made with conventional machines by submerged-arc welding in a conventional manner. In this regard, the full cross section of the cutout 10 is available on the inside B thereof for the insertion of automatic welders, whereas the profile-rib rings 11 and the vertical ribs 12 prevent the use of such automatic welding machines on the outside A beyond the cutout 10.

In FIG. 1, a projection 30, an inner edge of which is aligned with the inner contour of the profile-rib rings 11, is shown at a vertical rib 12. The baffle plates 5, 6 and 7 can also be welded to this projection 30, if it is also advantageous to attach the casing or jacket 3 at additional locations between the profile-rib rings 11.

When welding the casing or jacket 3 into the cage 2, it is advantageous to use a device which permits the cage 2 with the baffle plates 5, 6 and 7 to be rotated or turned over, so that the respective welds that are to be formed, are always in the most desirable position.

There is claimed:

1. Method of producing a core baffle with a plurality of integral horizontally disposed, parallel profile-rib rings for enclosing the fuel assemblies of a pressurized-water reactor, said method comprising, forming the profile-rib rings with respective cutouts having a polygonal contour at radially inner edges thereof corresponding to that of a reactor core; to each of the profile-rib rings, by welding, at a spaced distance from the radially inner edges thereof, one end of each of a plurality of ribs, each rib having respective cutouts at edges located at opposite ends thereof facing the respective profile-rib rings so that the weld between the profile-rib rings and rib is a spaced weld; successively welding the profile-rib rings to one another by the respective ribs thereof into a cage with the profile-rib rings coaxially arranged and spaced by the ribs; assembling baffle plates bent partly into profile sections into the form of a casing by bracing the plates against the radially inner edges of the profile-rib rings of the cage; successively welding the baffle plates to the profile-rib rings of the cage at the radially inner edges thereof; and welding the baffle plates to one another into a tight casing.

2. Method according to claim 1 wherein the successive welding of the baffle plates to the profile-rib rings is effected starting from the middle of the baffle plates.

3. Method according to claim 1 wherein the welding of the baffle plates to one another comprises forming a welding seam therebetween both from inside and outside the region of the respective cutout, a welding-seam part being initially formed by hand from the outside and another welding-seam part being then formed by submerged arc welding from the inside.

4. Method according to claim 1 which comprises, before welding the baffle plates to the profile-rib rings, measuring the cage and refinishing it in accordance with any need therefor.

5. Core baffle comprising a plurality of integral horizontally disposed, parallel profile-rib rings for enclosing the fuel assemblies of a pressurized water reactor, said profile-rib rings being arranged in spaced, coaxial relationship, said profile-rib rings formed with respective cutouts having a polygonal contour at radially inner edges thereof corresponding to that of the reactor core and with baffle plates secured parallel to the axis of said profile-rib rings at said radially inner edges thereof and forming a casing matching the contours of the cutouts, each of said profile-rib rings being spaced by a plurality of ribs secured by the ends thereof, respectively, by weldment to said profile-rib rings at a spaced distance from the radially inner edges thereof, said profile-rib rings being secured by weldment to one another by said ribs so as to form a cage, said baffle plates being bent partly into profile sections and being braced against the cage in the form of a casing, said baffle plates being secured by weldment to one another and to said profile-rib rings at said radially inner edges thereof, said ribs being formed with respective cutouts at edges located at opposite ends thereof facing the respective profile-rib rings so that the weldment between the profile-rib ring and rib is a spaced weld.

6. Core baffle according to claim 5 wherein said cutouts formed at the edges at the opposite ends of the ribs have a length that is substantially as great as the length of the edge at the respective end which is welded to the respective profile-rib ring.

7. Core baffle according to claim 5 wherein the ribs are formed with projections extending toward the baffle plates and secured thereto by weldment.

* * * * *